June 11, 1957   M. DISTEL   2,795,163
FLASH RANGING SYSTEM
Filed Aug. 30, 1950   2 Sheets-Sheet 1

INVENTOR.
MAURICE DISTEL
BY
Harry M. Saragovitz
Attorney

United States Patent Office 2,795,163
Patented June 11, 1957

2,795,163

FLASH RANGING SYSTEM

Maurice Distel, Red Bank, N. J., assignor to the United States of America as represented by the Secretary of the Army Application August 30, 1950, Serial No. 182,388

5 Claims. (Cl. 88—1)

(Granted under Title 35, U. S. Code (1952), sec. 266)

The invention described herein may be manufactured and used by or for the Government for governmental purposes, without the payment of any royalty thereon.

The present invention relates to radiation detecting and locating devices and more particularly to gun flash detecting and locating apparatus.

In a gun flash ranging system the position of the gun flash and therefore the position of the gun is located optically by determining the azimuth from each of at least two observation stations which are located along a predetermined base line. The position of the gun is then plotted using the observed azimuths. In the past this system required that a human observer be located at each station which is normally forward of the main position and is therefore exposed and vulnerable to enemy action. It was further required that the observer be continuously on the alert to detect the presence of the flashes.

It is an object of this invention to obviate the necessity for having human observers and also to make unnecessary the constant attendance by any personnel in order to detect flashes.

According to the invention there is provided a transient radiation and detecting and locating system comprising a plurality of radiation detecting and storing devices each of which has means for scanning the stored energy at a predetermined rate. Means are provided for comparing two successive scans in order to distinguish a signal caused by the transient or momentary radiation of a gun flash. Means are provided for recording and translating the signal representing this transient only upon the occurrence of a similar signal from at least one other observation station within a predetermined time interval.

These and other objects of the invention, together with other objects that may hereinafter appear, will be better understood with the following description taken in connection with the accompanying drawings of the preferred embodiment of the system in which.

Figure 1:
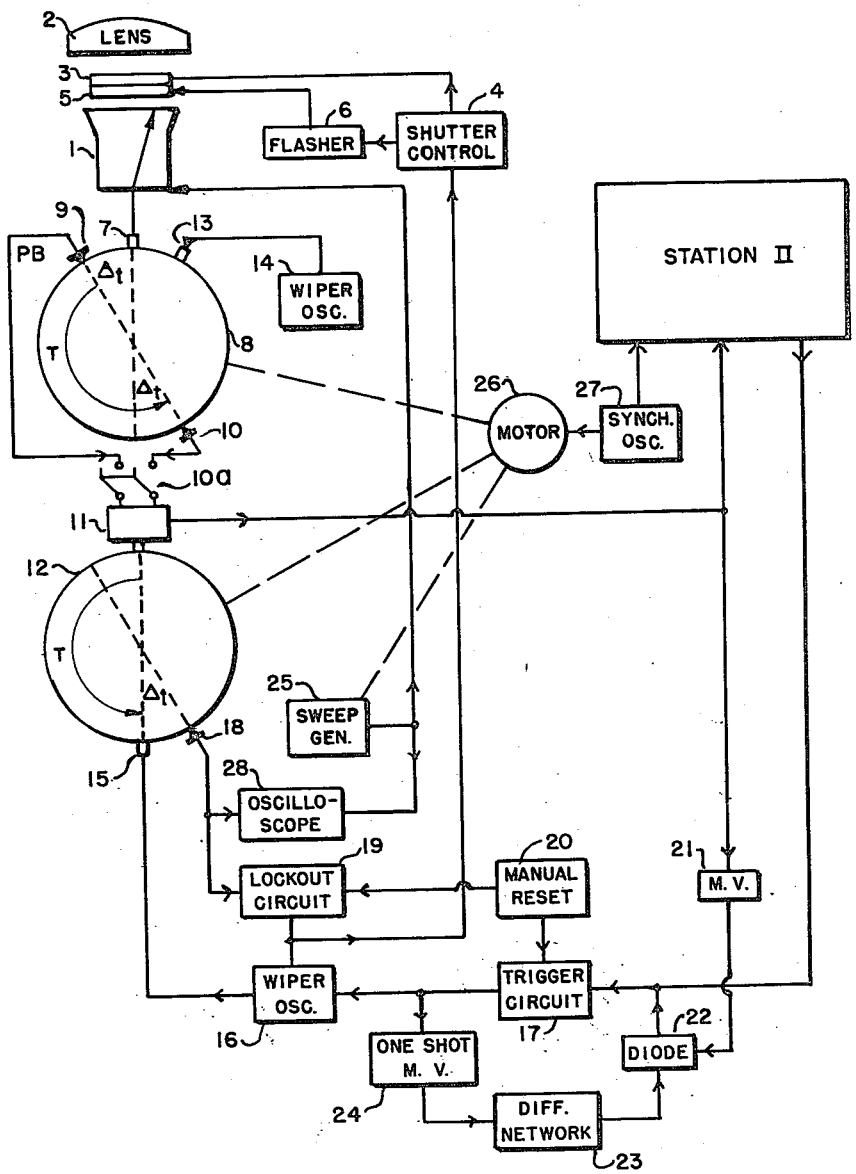
Fig. 1 is a block diagram of the components of each station.

Referring now to Fig. 1 which shows a block diagram of two stations and their interconnection. A pick-up device 1 which may be an image orthicon type of television tube, or any other radiation detecting and storing means, is located in the forward observation station. This pick-up tube is also provided with a cylindrical optical lens 2 which is used to narrow the vertical field of view to permit single line scanning of the entire vertical field of view. A shutter 3 is positioned in front of the pick-up tube and is operated by shutter control 4 to block out the field view upon the recording and transmission of the selected signal. In front of the shutter is a fiducial line grid 5 which may be constructed in any of the many ways known to the art. It may, for instance, be a transparent sheet of glass or plastic having etched lines. A flasher 6 operated by the shutter control 4 is provided for momentarily illuminating the grid after the closing of the shutter.

The output of the pick-up tube 1 is recorded by means of recording head 7 on recording drum 8. The recorded signals are played back by means of play back heads 9 and 10 which are spaced along the recording drum a distance equivalent to one scan. The outputs of both play back heads are differentially combined in recording head 11 which thereby records on recording drum 12 only a difference signal due to a transient. A start switch 10A is inserted before the differential recording head 11. Wiper head 13 erases all signals from drum 8 so that a clear tape is again provided for recording head 7. Wiper head 15 is positioned along recording drum 12 at a distance from recording head 11 corresponding to the time of one scan. Each wiper head is connected to a high frequency oscillator which provides the necessary high frequency signal used to clear the tape. Wiper oscillator 14 which is connected to wiper head 13 is continuously operative. However, wiper oscillator 16 which is connected to wiper head 15 is disabled by means of a trigger circuit 17 upon the receipt of a signal from observation station II. A play back head 18 picks up any signals which have been recorded on drum 12 and not erased by wiper head 15. This signal operates a lockout circuit 19 which disables wiper oscillator 16 until it is restarted by manual reset 20. The signal from play back 18 is also displayed on a cathode ray tube oscilloscope 28.

As will be more fully explained later, it is sometimes necessary that the wiper oscillator be disabled for more than the time duration of one scan. The extension of time is accomplished by using the difference signal obtained from recording drum 8 to operate multivibrator 21 which provides a positive signal to block diode 22.

Trigger circuit 17 is of the Eccles-Jordan type, consequently a trigger must be provided to return it to its original condition a predetermined time (one scan) after the first signal. This is accomplished by differentiating in differentiating circuit 23 the output of multivibrator 24 to provide a trigger of the correct polarity. This trigger is coupled through diode 22 unless blocked by the positive signal from multivibrator 21. A sweep voltage generator 25 provides a common scan voltage for tube 1 and oscilloscope 28.

Synchronization in each station is obtained by a common drive motor 26 which rotates recording drums 8 and 12 and controls sweep voltage generator 25. Synchronizing oscillator 27 is common to the entire system and synchronizes the motors of all stations, the components of which stations are identical.

Figure 2:
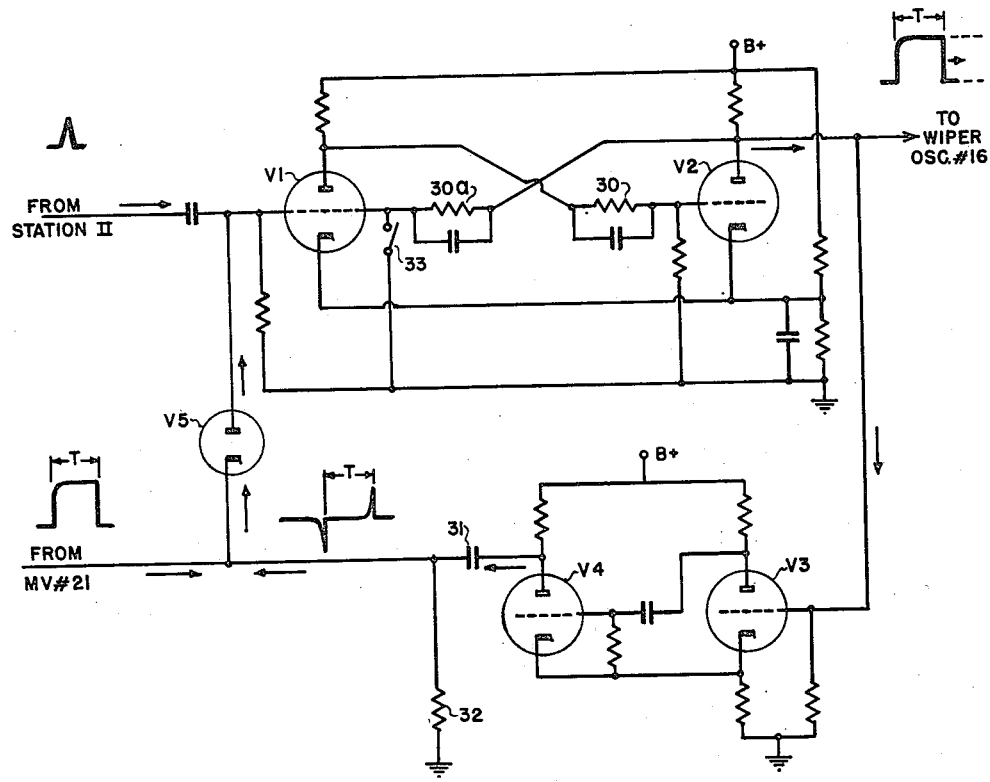
Fig. 2 is a schematic diagram of the coincidence circuit used to permit recording only upon the occurrence of signals at two stations within a predetermined time interval.

Referring now to Fig. 2 which is a partial schematic of the coincidence circuit, there is shown an Eccles-Jordan trigger circuit of a type which is well known in the art. In this type either tube will conduct and remain conducting until flipped over or rendered non-conducting by a trigger of appropriate polarity. It differs from the conventional Eccles-Jordan circuit in that resistor 30 is smaller than resistor 30A so that when started the trigger circuit will always take up a position in which tube V2 is conducting. This is necessary so that the input signal from the differential recording head, which is of positive polarity, will cause tube V1 to conduct and thereby cause tube V2 to stop conducting. Consequently, a positive output pulse will be produced at the plate of tube V2. Tube V2 will remain non-conducting until a signal of negative polarity is applied to the grid of tube V1. This negative pulse is obtained by coupling the output positive pulse from the plate of tube V2 to a one shot multivibrator comprising tubes V3 and V4 thereby causing the one shot multivibrator to flip over. The circuit of this multivibrator is also conventional.

The output taken from the plate of tube V4 is a positive pulse of time duration T which is equal to the duration of one scan. This pulse is differentiated through a differentiating circuit comprising a condenser 31, and a resistor 32 and the differentiated pulse is fed back through diode V5 to the grid of tube V1. The positive pulse produced by the leading edge of the pulse will not be coupled through the diode, but the negative pulse will be coupled and cause tube V1 to stop conducting. This flip over, however, will not occur when a pulse, which is positive in polarity, arrives from multivibrator 21. This latter pulse disables or cuts off diode V5 by making the cathode positive, and thereby inhibits the passage of the negative pulse of lower amplitude from the differentiating circuit.

Switch 33, which is part of manual reset circuit 20, is connected between grid and ground of tube VI and renders tube V1 non-conducting when closed.

In operation, the pick-up tube 1, which as indicated may be of the television type, is positioned and oriented at the observation station to cover a definite field of view. If the television type tube is used, it is necessary that the vertical field of view be compressed so that it occupies a narrow band on the pick-up tube. This is done so that the entire vertical field of view can be covered in one scan thereby permitting a slow rate of scan and consequently, enabling the information to be transmitted over a narrow bandwidth channel. This compression of the vertical field of view is done optically outside of the tube by means of an appropriately positioned cylindrical lens 2 but may be performed by electron-optical means within the tube by focusing the electron beam or combination of both. Since this tube will pick up and store all radiation, means must be provided for distinguishing between the transient radiation caused by a gun burst and the relatively constant background radiation.

This is accomplished by means of recording drum 8 which is rotated in synchronism with the sweep at a speed such that more than one scan may be recorded during one revolution of the drum. The signals, which are recorded on the drum, are played back by means of two play back heads 9, 10 which are positioned with respect to the tape so that they will play back successive scans. Their outputs are combined in opposition in a differential recording head 11 which records on a second recording drum 12 only a positive difference signal produced by the transient radiation. To insure that background radiation is not recorded by the differential recording head, a start switch is interposed between it and the outputs of the play back heads 8, 9. This switch may be manually or automatically closed after a predetermined time delay at least equivalent to one revolution of the drum. Wiper head 13 erases all the signals from the drum 8 after play back head 10 is passed so that a clear tape is again available for further recording. Wiping is accomplished in the conventional manner using a high frequency oscillator input to the wiping head. The difference signals which are recorded on recording drum 12 will be erased by wiping head 15 unless a difference signal has been recorded on the corresponding recording drum of station II within the next preceding or succeeding frame. The reason for this is to insure that only signals observed by at least two stations will be permanaently recorded and indicated on the cathode ray oscilloscope since it is evident that one signal will not be of value in plotting the location of the gun burst. The coincidence circuit, shown in Fig. 2, is provided for this purpose.

This coincidence circuit is designed to take care of the 4 possible situations that can occur with respect to a single gun flash, to wit:

1. A signal at station I and no signal at station II.
2. A signal at station II and no signal at station I.
3. A signal occurring at both stations but the signal is recorded at station I prior to its recording at station II.
4. A signal at both stations but the signal is recorded at station II prior to its recording at station I.

Taking the first situation, which may occur when terrain features screen the flash from station II. A signal which is picked up by station I is recorded on drum 12. It is wiped by wiper head 14 since there is no signal to operate trigger circuit 17 to disable wiper oscillator 16.

In the second situation in which a signal is recorded at station II there is no signal on recording drum 12 so that the operation of the coincidence circuit is immaterial.

In situation three in which a signal is recorded at station I prior to its recording on station II, if this signal at station II is recorded within one scan, the output from station II operates trigger circuit 17 and disables wiper oscillator 16 for a period corresponding to the time duration of one scan. Consequently, the signal will be picked up by play back head 18 and the output signal will be displayed on the cathode ray oscilloscope 28. This output signal also operates lockout circuit 19 which is an Eccles-Jordan trigger circuit, and renders the wiper oscillator inoperative until reset. Consequently, the signal will be retained and played back over and over again.

It is necessary to insure that no further signals are picked up by the pick-up tube so that no ambiguity will result. A shutter 3, positioned in front of the pick-up tube in a normally open position, is closed by shutter control 4 in response to a signal from the lockout circuit 19. Since it is desired to read azimuth, fiducial lines could be placed on the face of the oscilloscope but, due to the lack of linearity in sweep and scan, it is preferred to place an illuminated grid in front of the pick-up tube so that the same distortion of signal position and grid result. Because the system is responsive to only a transient signal the illumination of the grid must be momentary. This is accomplished by the operation of a flasher 6 in response to a signal from lockout circuit 19 through shutter control 4.

In the fourth situation in which a signal is recorded at station II prior to its recording at station I the circuit operates in this manner. The signal from station II will trigger circuit 17 and the output will disable wiper oscillator 16 for a period of time equivalent to one scan due to the feedback circuit which would normally tend to restore multivibrator 17 to its initial condition. This feedback circuit consists of one shot multivibrator 24, differentiator 23 and diode 22. However, if a signal is recorded on drum 8 at station I within one frame, the signal output of the differential recording head 11 is fed to multivibrator 21, it produces a positive pulse which raises the potential of the cathode of diode 22 thereby blocking the lesser negative signal from the feedback circuit. As a result, circuit 17 remains in its flipped position and wiper oscillator 16 remains disabled. The recorded signal is picked up by play back head 18 and the operation is as indicated in situation 3 above.

A manual reset has been provided to return the system to its initial condition. This manual reset consists of a multi-element switch, one set of elements, as indicated in Fig. 2, is connected from grid to ground of tube VI of the trigger circuit. When operated it will tend to short tthe grid to ground thereby re-establishing the initial condition. The lockout circuit 19 is similar to the trigger circuit 17 and the manual reset operates upon it in a similar manner.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a flash ranging system; a plurality of radiation detecting and storing means displaced from each other a predetermined distance, each of said means having means for scanning the stored radiation at a predetermined rate, a first recording drum, the rotation of said first drum being synchronized with said scanning rate but being a submultiple thereof, means for recording the stored signals on said first recording drum, first and second play back means disposed along said drum and displaced from each other a distance corresponding to one scan, means for combining the outputs of said first and second play back heads to produce a difference signal representing a change in detected and stored radiation, a second recording drum synchronized with said first drum, means for recording said difference signal on said second drum, signal wiping means disposed along said drum at a distance from said last mentioned recording means corresponding to one scan, third play back means disposed along said second drum beyond said wiping means, cathode ray tube indicating means connected to said third play back means, means for disabling said wiping means upon the recording of a difference signal at at least one other of said radiation detecting and storing means within a predetermined time interval, shutter means responsive to a signal from said disabling means for preventing the storing of further radiation in said radiation detecting and storing means, and means for projecting a fiducial line grid on said indicating means.

2. A device according to claim 1 wherein said disabling means comprises a trigger circuit for disabling said wiper means responsive to a difference signal from at least one other of said detecting and storing means, means for resetting said trigger circuit after a predetermined time interval equivalent to one scan, said resetting means including a first multivibrator, a differentiating circuit connected to said first multivibrator for producing a delayed negative pulse, a diode for coupling said pulse to reset said trigger circuit and a second multivibrator for blocking said diode for a predetermined time interval in response to a difference signal from said first drum.

3. In a flash ranging system; a plurality of radiation detecting and storing means displaced from each other a predetermined distance, each of said means having means for scanning at a predetermined rate, a first recording drum, the rotation of said drum being synchronized with said scanning rate but being a submultiple therof, means for recording the stored signals on said first recording drum, first and second play back means disposed along said drum and displaced from each other a distance corresponding to one scan, means for combining the outputs of said first and second play back heads to produce a difference signal representing a change in detected and stored radiation, a second recording drum synchronized with said first drum, means for recording said difference signal on said second drum, signal wiping means disposed along said drum at a distance from said last mentioned recording means corresponding to one scan, third play back means disposed along said second drum beyond said wiping means, indicating means connected to said third play back means, lockout means for disabling said wiping means upon the recording of a difference signal at at least one other of said radiation detecting and storing means within a predetermined time interval, and shutter means responsive to a signal from said lockout means for preventing the storing of radiation in said radiation detecting and storing means.

4. In a flash ranging system; a plurality of radiation detecting and storing means displaced from each other a predetermined distance, each of said means having means for scanning at a predetermined rate, a first recording drum the rotation of said drum being synchronized with said scanning rate but being a submultiple thereof, means for recording the stored signals on said first recording drum, first and second play back means disposed along said drum and displaced from each other a distance corresponding to one scan, means for combining the outputs of said first and second play back heads to produce a difference signal representing a change in detected and stored radiation, a second recording drum synchronized with said first drum, means for recording said difference signal on said second drum, signal wiping means disposed along said drum at a distance from said last mentioned recording means coresponding to one scan, third play back means disposed along said drum beyond said wiping means, indicating means connected to said third play back means, means for disabling said wiping means upon the recording of a difference signal at at least one other of said radiation detecting and storing means within a predetermined time interval, and means responsive to a signal from said disabling means for preventing the storing of radiation in said radiation detecting and storing means.

5. In a flash ranging system; a plurality of radiation detecting and storing devices each having means for scanning the stored energy at a predetermined rate, means for comparing the output of two successive scans from each of said devices to produce a difference signal representing transient radiation, and means for translating and recording the difference signal from each of said devices only upon the occurrence of a difference signal within a predetermined time interval from at least one other of said devices.

References Cited in the file of this patent

UNITED STATES PATENTS

| | | |
|---|---|---|
| 2,410,424 | Brown | Nov. 5, 1946 |
| 2,416,968 | Turrettini | Mar. 4, 1947 |
| 2,422,135 | Sanders | June 10, 1947 |
| 2,444,235 | Walker | June 29, 1948 |
| 2,463,233 | Alexanderson | Mar. 1, 1949 |
| 2,489,220 | Herbold | Nov. 22, 1949 |
| 2,499,910 | Frommer | Mar. 7, 1950 |